United States Patent
Hsu et al.

(10) Patent No.: US 11,949,437 B2
(45) Date of Patent: Apr. 2, 2024

(54) WIDEBAND ANTENNA SYSTEM

(71) Applicant: ASUSTeK COMPUTER INC., Taipei (TW)

(72) Inventors: Chien-Ming Hsu, Taipei (TW); Chun-Chieh Su, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 283 days.

(21) Appl. No.: 17/571,628

(22) Filed: Jan. 10, 2022

(65) Prior Publication Data
US 2022/0231708 A1 Jul. 21, 2022

(30) Foreign Application Priority Data
Jan. 21, 2021 (TW) .................... 110102392

(51) Int. Cl.
*H04B 1/00* (2006.01)
*H01Q 1/24* (2006.01)
*H01Q 5/328* (2015.01)
*H01Q 5/335* (2015.01)

(52) U.S. Cl.
CPC ............ *H04B 1/006* (2013.01); *H01Q 5/328* (2015.01); *H01Q 5/335* (2015.01); *H01Q 1/241* (2013.01)

(58) Field of Classification Search
CPC ........ H01Q 1/241; H01Q 5/328; H01Q 5/335; H01Q 9/42; H04B 1/006
See application file for complete search history.

(56) References Cited

U.S. PATENT DOCUMENTS

| 10,923,817 | B2 | 2/2021 | Qiu et al. | |
| 2010/0060531 | A1* | 3/2010 | Rappaport | H01Q 1/243 |
| | | | | 455/39 |
| 2019/0363428 | A1 | 11/2019 | Zhu et al. | |
| 2020/0287583 | A1 | 9/2020 | Farahvash et al. | |
| 2021/0234561 | A1* | 7/2021 | De Jongh | H04B 1/401 |
| 2021/0273340 | A1* | 9/2021 | Sun | H01Q 5/10 |
| 2021/0384626 | A1* | 12/2021 | Li | H01Q 9/42 |
| 2023/0028988 | A1* | 1/2023 | Li | H01Q 5/371 |

FOREIGN PATENT DOCUMENTS

| CN | 206864615 U | 1/2018 |
| CN | 110011025 A | 7/2019 |

* cited by examiner

*Primary Examiner* — Nguyen T Vo
(74) *Attorney, Agent, or Firm* — McClure, Qualey & Rodack, LLP

(57) ABSTRACT

A wideband antenna system includes a metal radiating portion, an aperture contact, a feed contact, an aperture tuner, an impedance tuner, a first switch, and a second switch. Two ends of the metal radiating portion respectively include a first contact and a second contact. The aperture contact is electrically connected to the metal radiating portion and is located between the first contact and the second contact. The feed contact is electrically connected to the metal radiating portion and is located between the first contact and the aperture contact. The aperture tuner is electrically connected to the aperture contact, and the impedance tuner is electrically connected to the feed contact. The first switch is electrically connected between the first contact and a zero-ohm resistor to selectively effect connection of the first contact to the zero-ohm resistor. The second switch is electrically connected between the first contact and the impedance.

10 Claims, 6 Drawing Sheets

WIDEBAND ANTENNA SYSTEM

CROSS-REFERENCE TO RELATED APPLICATION

This application claims the priority benefit of Taiwan application serial No. 110102392, filed on Jan. 21, 2021. The entirety of the above-mentioned patent application is hereby incorporated by reference herein and made a part of specification.

BACKGROUND OF THE INVENTION

Field of the Invention

The disclosure relates to a wideband antenna system.

Description of the Related Art

In the existing antenna design of consumer electronic products, 2G/3G/4G/sub-6G communication systems having an operating frequency of 617 MHz to 5000 MHz may be supported. Generally, the frequency range is divided into a low band (617 MHz to 960 MHz), a medium band (1475 MHz to 2200 MHz), a high band (2300 MHz to 2690 MHz), and an ultra-high band (3300 MHz to 5000 MHz). Conventionally, if all of the bands are designed in the same antenna system, the antenna efficiency of all bands cannot be guaranteed simultaneously. As a result, the efficiency of some bands may be impact.

For example, due to the bandwidth supported by the antenna is increased, an antenna tuner is usually applied switch the antenna frequency. The antenna tuner may be sorted into an aperture tuner and an impedance tuner. In the antenna design, one aperture tuner is used with one impedance tuner, or two aperture tuners are used. However, such manners only support the low band, the medium band, and the ultra-high band, but the efficiency of the high band under the configuration is not good. For the instance that when the configuration supports the low band, the high band, and the ultra-high band, the efficiency of the medium band is not good. Therefore, the conventional configurations cannot simultaneously guarantee the efficiency of all bands.

BRIEF SUMMARY OF THE INVENTION

According to an aspect of the disclosure, a wideband antenna system is provided. The wideband antenna system includes a metal radiating portion, an aperture contact, a feed contact, an aperture tuner, an impedance tuner, a first switch, and a second switch. Two ends of the metal radiating portion respectively include a first contact and a second contact. The aperture contact is electrically connected to the metal radiating portion and is located between the first contact and the second contact. The feed contact is electrically connected to the metal radiating portion and is located between the first contact and the aperture contact. The aperture tuner is electrically connected to the aperture contact, and the impedance tuner is electrically connected to the feed contact. The first switch is electrically connected between the first contact and a zero-ohm resistor to selectively effect connection of the first contact to the zero-ohm resistor. The second switch is electrically connected between the first contact and the impedance tuner to selectively effect connection of the first contact to the impedance tuner.

To sum up, the wideband antenna system provided in the disclosure can simultaneously support antenna operating bands such as a low band, a medium band, a high band, and an ultra-high band, which achieves good antenna efficiency.

The purposes, the technical content, and the effects achieved in the disclosure are easier to understand by means of specific embodiments, accompanying drawings, and detailed description.

DETAILED DESCRIPTION OF THE EMBODIMENTS

Figure 1:
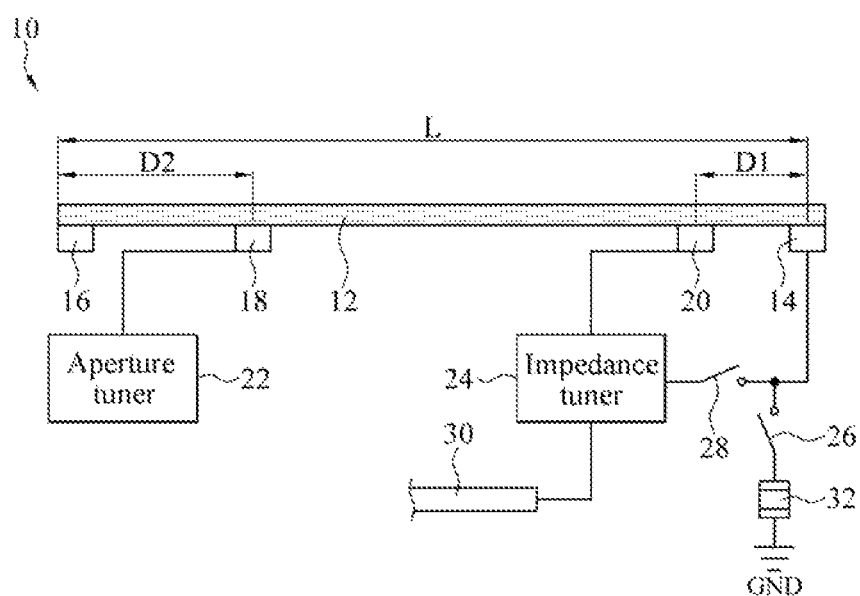
FIG. 1 is a schematic diagram of an architecture of a wideband antenna system according to an embodiment of the disclosure.

Referring to FIG. 1, a wideband antenna system 10 includes a metal radiating portion 12, an aperture contact 18, a feed contact 20, an aperture tuner 22, an impedance tuner 24, a first switch 26, and a second switch 28. Two ends of the metal radiating portion 12 respectively include a first contact 14 and a second contact 16. The aperture contact 18 is electrically connected to the metal radiating portion 12 and is located at a position close to the second contact 16 between the first contact 14 and the second contact 16. The feed contact 20 is also electrically connected to the metal radiating portion 12 and is located between the first contact 14 and the aperture contact 18. The aperture tuner 22 is electrically connected to the aperture contact 18 for switching a grounding path. The impedance tuner 24 is electrically connected to the feed contact 20 to transmit a radio frequency signal transmitted from a cable 30 or transmit a received radio frequency signal to a back end via the cable 30. The first switch 26 is electrically connected between the first contact 14 and a zero-ohm resistor 32, and an other end of the zero-ohm resistor 32 is connected to a ground terminal GND, so that the first switch 26 can selectively effect connection of the first contact 14 to the zero-ohm resistor 32. The second switch 28 is electrically connected between the first contact 14 and the impedance tuner 24 to selectively effect connection of the first contact 14 to the impedance tuner 24.

In an embodiment, if the metal radiating portion 12 has a length L, a first distance D1 between the first contact 14 and the feed contact 20 is L/10-L/4, and a second distance D2 between the second contact 16 and the aperture contact 18 is L/10-2L/3.

Figure 2A:
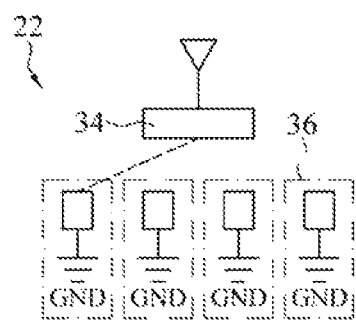
FIG. 2A to FIG. 2D are each a schematic diagram of a circuit of an aperture tuner according to an embodiment of the disclosure.
Figure 2B:
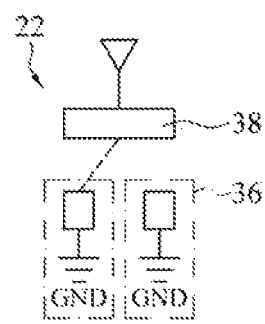

In an embodiment, the aperture tuner 22 further includes a switch module and a plurality of grounding paths, so as to switch and select one of the grounding paths by means of the switch module. In addition, the grounding path includes at least one of an open grounding path and at least one passive element grounding path, and a zero-ohm resistor grounding path. Referring to FIG. 2A, the switch module in the aperture tuner 22 is a single-pole four-throw (SP4T) switch 34, and four grounding paths 36 are connected to the SP4T switch 34. Each of the grounding paths 36 comprises a passive element, an open circuit, or a zero-ohm resistor connected to the ground terminal, so as to form a passive element grounding path, an open circuit grounding path, or a zero-ohm resistor grounding path. In this embodiment, the four grounding paths 36 may include an open circuit grounding path, two passive element grounding paths, and a zero-ohm resistor grounding path. Referring to FIG. 2B, the switch module in the aperture tuner 22 is at least one single-pole double-throw (SPDT) switch 38, and two grounding paths 36 are connected to the SPDT switch 38. Each of the grounding paths 36 comprises a passive element, an open circuit, or a zero-ohm resistor connected to the ground terminal, so as to form a passive element grounding path, an open circuit grounding path, or a zero-ohm resistor grounding path. In this embodiment, the two grounding paths 36 may include an open circuit grounding path, or one passive element grounding path, and a zero-ohm resistor grounding path.

Figure 2C:
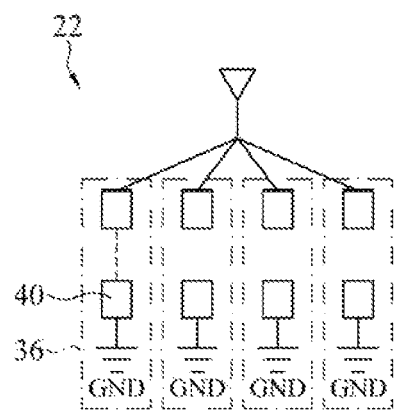
Figure 2D:
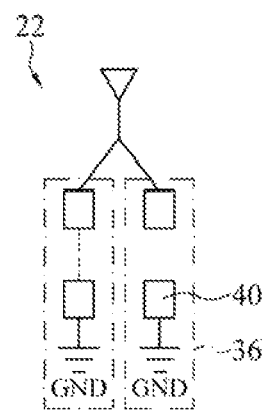

In an embodiment, the aperture tuner 22 further use switches the grounding path 36 through a plurality of single-pole single-throw (SPST) switches 40. Referring to FIG. 2C, the switch module in the aperture tuner 22 is four SPST switches 40, and each of the SPST switches 40 is connected to one grounding path 36. Each of the grounding paths 36 comprises a passive element, an open circuit, or a zero-ohm resistor connected to the ground terminal by the SPST switches 40, so as to form a passive element grounding path, an open circuit grounding path, or a zero-ohm resistor grounding path. In this embodiment, the four grounding paths 36 may include an open circuit grounding path, two passive element grounding paths, and a zero-ohm resistor grounding path. Referring to FIG. 2D, the switch module in the aperture tuner 22 is two SPST switches 40, and one grounding path 36 is connected to each of the SPST switches 40. Each of the grounding paths 36 comprises a passive element, an open circuit, or a zero-ohm resistor connected to the ground terminal by the SPST switches 40, so as to form a passive element grounding path, an open circuit grounding path, or a zero-ohm resistor grounding path. In this embodiment, the two grounding paths 36 includes an open circuit grounding path, or one passive element grounding path, and a zero-ohm resistor grounding path.

In an embodiment, the passive element path may be a capacitor grounding path, an inductor grounding path, or a resistor grounding path.

Figure 3:
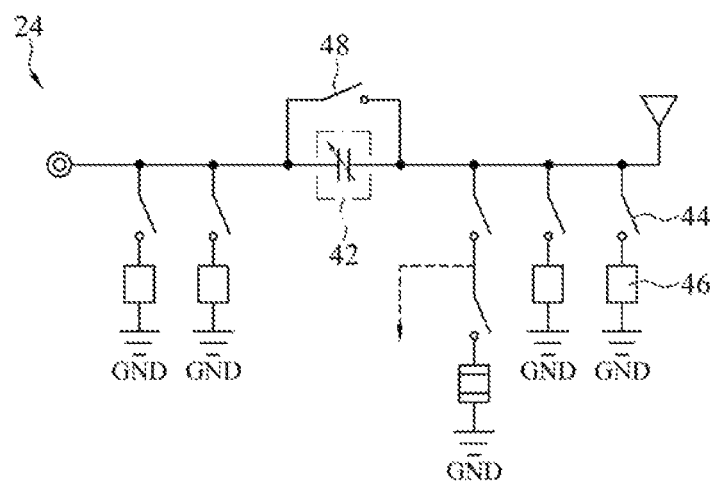
FIG. 3 is a schematic diagram of a circuit of an impedance tuner according to an embodiment of the disclosure.

In an embodiment, a circuit structure of the impedance tuner 24 is shown in FIG. 3. The impedance tuner 24 usually includes a variable capacitor 42 connected to a plurality of switches 44 connected in parallel. Each of the switches 44 is electrically connected to a passive element 46, and an other end of the passive element 46 is connected to the ground terminal GND. The variable capacitor 42 is connected in parallel to a bypass switch 48 to select passive elements 46 having different values by means of a plurality of switches 44 for switching different antenna bands. The passive element 46 may be a capacitor, an inductor, or a resistor.

In an embodiment, referring to FIG. 1, the above metal radiation portion 12 may be a metal frame or a metal back cover of an electronic device, or a metal plane attached to an electronic device. For example, the metal radiation portion 12 may be a metal case of an electronic device or a metal portion or a metal plate inside a plastic case of an electronic device, which is not limited thereto. The metal radiating portion 12 may be different with the application of the wideband antenna system 10.

Figure 4:
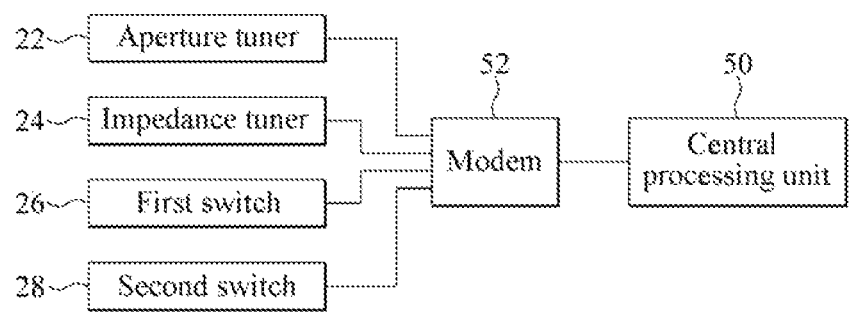
FIG. 4 is a schematic block diagram of a central processing unit controlling operations according to an embodiment of the disclosure.

In an embodiment, referring to FIG. 1 and FIG. 4 together, the aperture tuner 22, the impedance tuner 24, the first switch 26, and the second switch 28 are controlled by a central processing unit (CPU) 50. The CPU 50 generates a corresponding mobile industry processor interface (MIPI) control signal according to a requirement of an antenna band. The MIPI control signal is transmitted to the aperture tuner 22, the impedance tuner 24, the first switch 26, and the second switch 28 via a modem 52 to control operations of all switches (ON and OFF).

Figure 5:
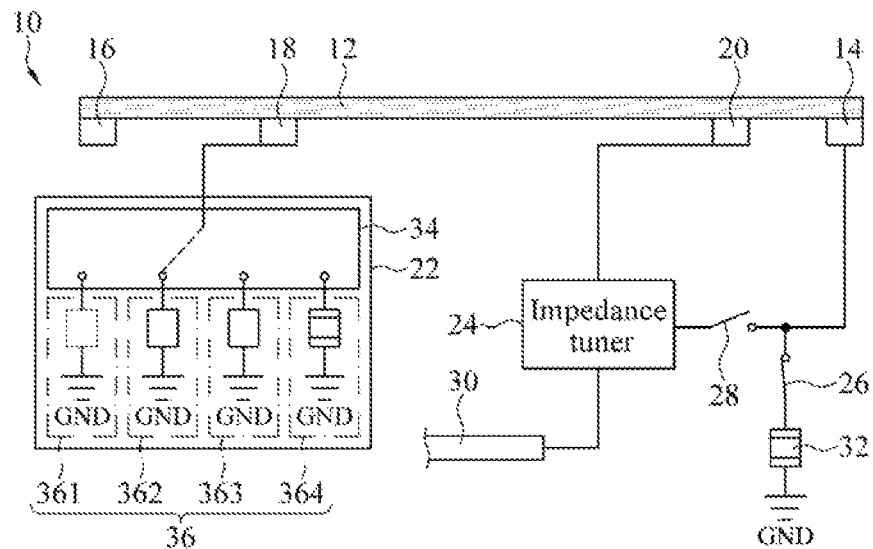
FIG. 5 is a schematic diagram of a circuit of a wideband antenna system in a first operating status according to an embodiment of the disclosure.

Detailed operations of the wideband antenna system continue to be described. The aperture tuner 22 in the wideband antenna system 10 uses the SP4T switch 34. Referring to FIG. 1 and FIG. 5 together, the four grounding paths 36 connected to the single-pole four-throw switch 34 are respectively an open grounding path 361, two passive element grounding paths 362 and 363, and a zero-ohm resistor grounding path 364. In a first operating status of the wideband antenna system 10, the first switch 26 is in an ON state, and the second switch 28 is in an OFF state. The SP4T switch 34 in the aperture tuner 22 switches the grounding path 36 to the open grounding path 361 or the passive element grounding paths 362, 363. In this embodiment, the passive element grounding path 362 is connected, for example. In this case, the aperture contact 18 is connected to the ground terminal GND through the passive element grounding path 362, the first contact 14 is connected to the ground terminal GND through the first switch 26 and the zero-ohm resistor 32, and the radio frequency signal transmitted via the cable 30 is fed to the feed contact 20 by the impedance tuner 24. In the first operating status, the wideband antenna system 10 can support a low band, a high band, and an ultra-high band, and can achieve good antenna efficiency.

Figure 6:
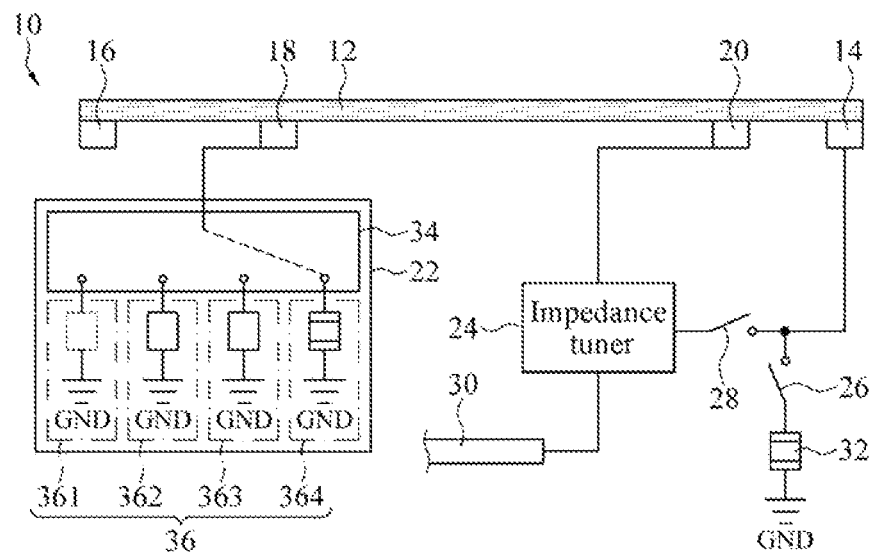
FIG. 6 is a schematic diagram of a circuit of a wideband antenna system in a second operating status according to an embodiment of the disclosure.

In a second operating status of the wideband antenna system 10, referring to FIG. 1 and FIG. 6 together, the first switch 26 is in an OFF state, and the second switch 28 is in an OFF state. The SP4T switch 34 in the aperture tuner 22 switches the grounding path 36 to the zero-ohm resistor grounding path 364. In this embodiment, the passive element grounding path 364 is connected, for example. In this case, the aperture contact 18 is connected to the ground terminal GND through the zero-ohm resistor grounding path 364, the first contact 14 is not connected, and the radio frequency signal transmitted via the cable 30 is fed to the feed contact 20 by the impedance tuner 24. In the second operating status, the wideband antenna system 10 can support a medium band, the high band, and the ultra-high band, and can achieve good antenna efficiency.

Figure 7:
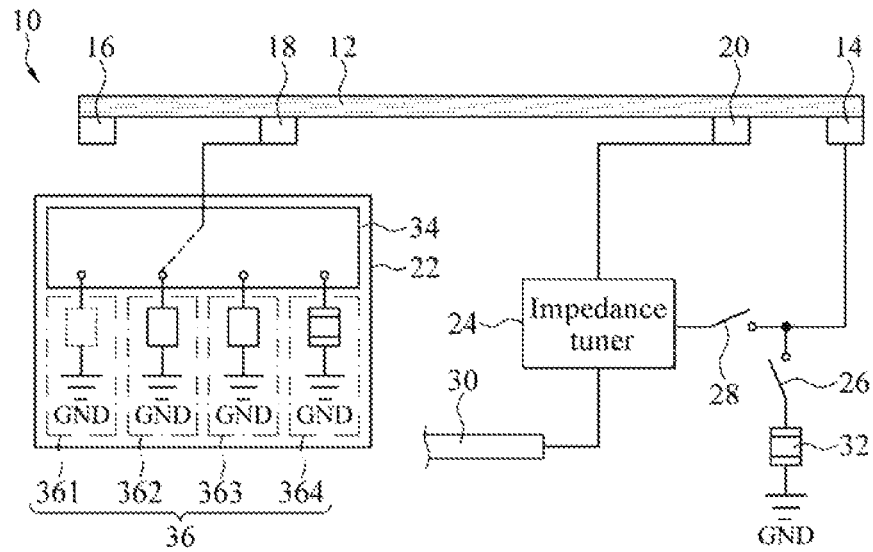
FIG. 7 is a schematic diagram of a circuit of a wideband antenna system in a third operating status according to an embodiment of the disclosure.

In a third operating status of the wideband antenna system 10, referring to FIG. 1 and FIG. 7 together, the first switch 26 is in an OFF state, and the second switch 28 is in an OFF state. The SP4T switch 34 in the aperture tuner 22 switches the grounding path 36 to the open grounding path 361 or the passive element grounding paths 362, 363. In this embodiment, the passive element grounding path 362 is connected, the aperture contact 18 is connected to the ground terminal GND through the passive element grounding path 362, the first contact 14 is not connected, and the radio frequency signal transmitted via the cable 30 is fed to the feed contact 20 by using the impedance tuner 24. In the third operating status, the wideband antenna system 10 can support the low band and the medium band, or support the low band and the high band, and can achieve good antenna efficiency.

Figure 8:
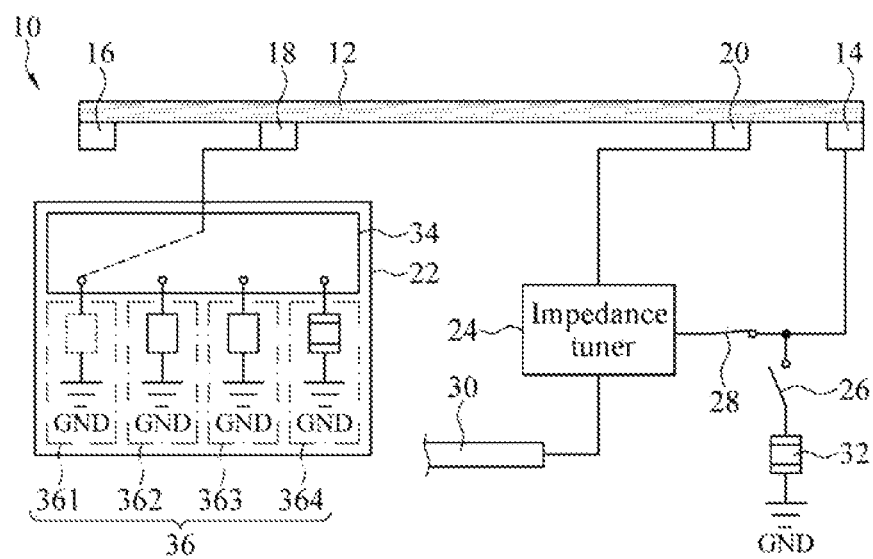
FIG. 8 is a schematic diagram of a circuit of a wideband antenna system in a fourth operating status according to an embodiment of the disclosure.

In a fourth operating status of the wideband antenna system 10, referring to FIG. 1 and FIG. 8 together, the first switch 26 is in an OFF state, and the second switch 28 is in an ON state. The SP4T switch 34 in the aperture tuner 22 switches the grounding path 36 to the open grounding path 361 or the passive element grounding paths 362, 363. In this embodiment, the open grounding path 361 is connected, the aperture contact 18 is open through the open grounding path 361, the first contact 14 is connected to the impedance tuner 24 through the second switch 28, and the radio frequency signal transmitted via the cable 30 is simultaneously fed to the feed contact 20 and the first contact 14 by the impedance tuner 24 and the second switch 28, so as to achieve the effect of dual feed. In the fourth operating status, the wideband antenna system 10 can support the low band, the medium band, the high band, and the ultra-high band, and can achieve good antenna efficiency.

Therefore, suitable distances of the first distance D1 and the second distance D2 are selected, and through the adjustment of the impedance tuner 24 and the aperture tuner 22 and the switching of the first switch 26 and the second switch 28, the wideband antenna system 10 can select an applicable operating status according to different antenna bands to simultaneously support the low band, the medium band, the high band, and the ultra-high band, thereby optimizing the antenna performance.

Figure 9:
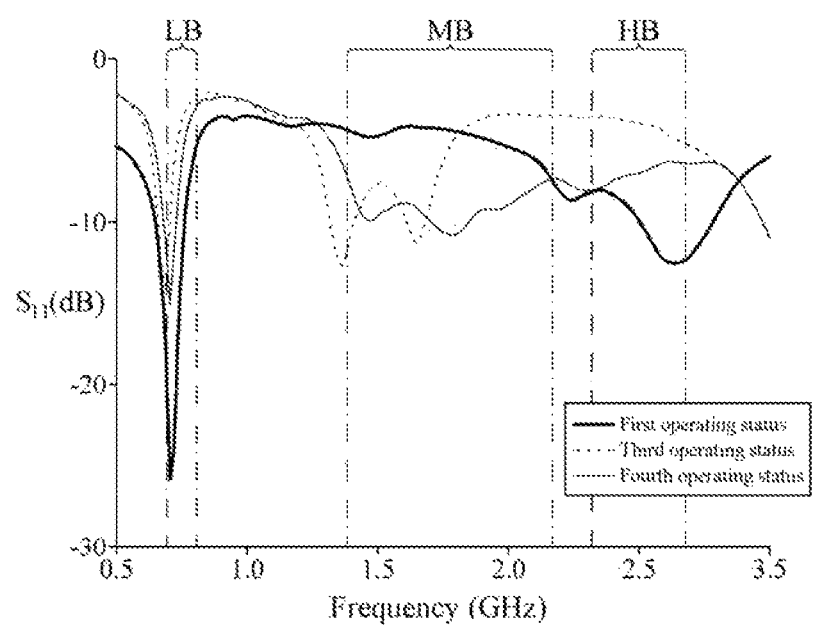
FIG. 9 is a schematic diagram of S-parameter simulation of a wideband antenna system according to the disclosure.

Referring to FIG. 1, FIG. 5, and FIG. 7 to FIG. 9 together, during transmission of the radio frequency signal (700 MHz used as an example) in the wideband antenna system 10 in the first operating status in FIG. 5, the wideband antenna system 10 in the third operating status in FIG. 7, and the wideband antenna system 10 in the fourth operating status in FIG. 8, S-parameter simulation is performed. In the operating bands of the low band LB, the medium band MB, and the high band HB, S-parameter simulation results are shown in FIG. 9 and Table 1 below. The wideband antenna system 10 in the first operating status performs well in the low band LB and the high band HB, the wideband antenna system 10 in the third operating status also performs well in the low band LB and the medium band MB, and the wideband antenna system 10 in the fourth operating status (dual feed) performs the best and performs well in the low band LB, the medium band MB, and the high band HB. Therefore, it may be learned from the foregoing experimental results that the wideband antenna system 10 of the disclosure indeed has good antenna efficiency, and the wideband antenna system 10 (shown in FIG. 8) in the fourth operating status (dual feed) may further greatly improve the antenna efficiency and increase design dimensions.

TABLE 1

| Gain (dBi) | Frequency (MHz) | | |
|---|---|---|---|
| | 754 (LB) | 1805 (MB) | 2600 (HB) |
| First operating status | −7.4 | −12.3 | −6.4 |
| Third operating status | −10.7 | −8.8 | −19.2 |
| Fourth operating status | −9.4 | −6.4 | −6.8 |

Based on the above, the wideband antenna system of the disclosure can simultaneously support antenna operating bands such as the low band, the medium band, the high band, and an ultra-high band, so as to achieve a wide band effect and good antenna efficiency.

The above embodiments are merely to describe the technical ideas and features of the disclosure, which are intended to enable those who are familiar with the technology to understand the content of the disclosure and implement them accordingly. Equivalent changes or modifications made to the spirit of the disclosure should still shall fall within the scope of the patent application in the disclosure.

What is claimed is:

1. A wideband antenna system, comprising:
a metal radiating portion, wherein two ends of the metal radiating portion respectively comprise a first contact and a second contact;
an aperture contact, electrically connected to the metal radiating portion and located between the first contact and the second contact;
a feed contact, electrically connected to the metal radiating portion and located between the first contact and the aperture contact;
an aperture tuner, electrically connected to the aperture contact;
an impedance tuner, electrically connected to the feed contact;
a first switch, electrically connected between the first contact and a zero-ohm resistor to selectively effect connection of the first contact to the zero-ohm resistor; and
a second switch, electrically connected between the first contact and the impedance tuner to selectively effect connection of the first contact to the impedance tuner.

2. The wideband antenna system according to claim 1, wherein if the metal radiating portion has a length L, a first distance between the first contact and the feed contact is L/10-L/4, and a second distance between the second contact and the aperture contact is L/10-2L/3.

3. The wideband antenna system according to claim 1, wherein the aperture tuner further comprises a plurality of grounding paths for selecting one of the grounding paths, and the grounding path comprises at least one of an open grounding path and at least one passive element grounding path, and a zero-ohm resistor grounding path.

4. The wideband antenna system according to claim 3, wherein when the first switch is in an ON state, the second switch is in an OFF state, and the aperture tuner is switched to the open grounding path or the passive element grounding path, the wideband antenna system supports a low band, a high band, and an ultra-high band.

5. The wideband antenna system according to claim 3, wherein when the first switch is in an OFF state, the second switch is in an OFF state, and the aperture tuner is switched to the zero-ohm resistor grounding path, the wideband antenna system supports a medium band, a high band, and an ultra-high band.

6. The wideband antenna system according to claim 3, wherein the first switch is in an OFF state, the second switch is in an OFF state, and the aperture tuner is switched to the open grounding path or the passive element grounding path, the wideband antenna system supports a low band and a medium band, or a low band and a high band.

7. The wideband antenna system according to claim 3, wherein when the first switch is in an OFF state, the second switch is in an ON state, and the aperture tuner is switched to the open grounding path or the passive element grounding path, so that both the first contact and the feed contact are capable of feeding signals, the wideband antenna system supports a low band, a medium band, a high band, and an ultra-high band.

8. The wideband antenna system according to claim 3, wherein the passive element path is a capacitor grounding path, an inductor grounding path, or a resistor grounding path.

9. The wideband antenna system according to claim 3, wherein the aperture tuner further comprises a switch module electrically connected to the grounding paths, so as to switch one of the grounding paths to be connected.

10. The wideband antenna system according to claim 9, wherein the switch module is a single-pole four-throw (SP4T) switch, at least one single-pole double-throw (SPDT) switch, or a plurality of single-pole single-throw (SPST) switch.

* * * * *